US011461747B1

United States Patent
Thomas et al.

(10) Patent No.: US 11,461,747 B1
(45) Date of Patent: *Oct. 4, 2022

(54) CARDLESS ATM AUTHENTICATION

(71) Applicant: Wells Fargo Bank, N.A., San Francisco, CA (US)

(72) Inventors: Michael R. Thomas, San Francisco, CA (US); Armin Ajami, San Francisco, CA (US); Roger Baclig, Daly City, CA (US); Jeffrey Cornman, San Francisco, CA (US); Darrell Suen, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 14/842,292

(22) Filed: Sep. 1, 2015

Related U.S. Application Data

(60) Provisional application No. 62/044,699, filed on Sep. 2, 2014.

(51) Int. Cl.
*G06F 21/35* (2013.01)
*G06Q 20/10* (2012.01)
*G06Q 20/32* (2012.01)
*G06Q 20/40* (2012.01)

(52) U.S. Cl.
CPC ......... *G06Q 20/1085* (2013.01); *G06F 21/35* (2013.01); *G06Q 20/322* (2013.01); *G06Q 20/4016* (2013.01)

(58) Field of Classification Search
CPC .......... H04N 1/00413; G06Q 20/1085; G06Q 20/3223; G06Q 20/4016; G06Q 20/4012; G06F 21/35
See application file for complete search history.

(56) References Cited

U.S. PATENT DOCUMENTS

| 8,336,766 B1 | 12/2012 | Miller et al. | |
|---|---|---|---|
| 8,632,000 B2 * | 1/2014 | Laracey | G06Q 20/1085 235/379 |
| 9,401,077 B2 * | 7/2016 | Laracey | G06F 21/35 |

(Continued)

FOREIGN PATENT DOCUMENTS

CA     2765806 A1 * 7/2012 ......... G06Q 20/1085

OTHER PUBLICATIONS

De Luca et al., Towards understanding ATM security: a field study of real world ATM use, ACM Digital Library, Proceedings of the Sixth Symposium on usable privacy and security, Jul. 14, 2010, p. 1-10.*

(Continued)

Primary Examiner — Ilse I Immanuel
(74) Attorney, Agent, or Firm — Foley & Lardner LLP

(57) ABSTRACT

Systems and methods for cardless authentication of a user at an automated teller machine are described. The ATM may be operated by a financial institution such as a bank. The method comprises displaying an initial screen on the ATM and authenticating the user at the ATM using authentication information transferred from a mobile device. The method further comprises determining available service options for the user of the ATM based upon the cardless authentication of the user at the ATM using the mobile device.

13 Claims, 3 Drawing Sheets

(56) References Cited

U.S. PATENT DOCUMENTS

| | | | |
|---|---|---|---|
| 10,373,246 B1* | 8/2019 | Groenjes | G06Q 40/00 |
| 2002/0184103 A1 | 12/2002 | Shah et al. | |
| 2009/0313156 A1 | 12/2009 | Herr | |
| 2010/0051686 A1 | 3/2010 | Obi | |
| 2011/0238573 A1 | 9/2011 | Varadarajan | |
| 2012/0160912 A1* | 6/2012 | Laracey | G06Q 20/1085 |
| | | | 235/379 |
| 2012/0197797 A1* | 8/2012 | Grigg | G07F 19/20 |
| | | | 705/43 |
| 2013/0226799 A1* | 8/2013 | Raj | G07C 9/00 |
| | | | 705/44 |
| 2013/0238497 A1 | 9/2013 | Ramachandran et al. | |
| 2014/0040147 A1* | 2/2014 | Varadarajan | G06Q 20/3823 |
| | | | 705/71 |
| 2014/0208419 A1* | 7/2014 | Chang | G06F 21/31 |
| | | | 726/21 |
| 2015/0058146 A1* | 2/2015 | Gaddam | G06Q 20/322 |
| | | | 705/21 |
| 2016/0012412 A1 | 1/2016 | Scanlon et al. | |

OTHER PUBLICATIONS

Rit Mishra, "The Game-Changing Nature of Beacons", Feb. 26, 2014, UX Magazine, pp. 1-5 (Year: 2014).

* cited by examiner

CARDLESS ATM AUTHENTICATION

CROSS-REFERENCE TO RELATED PATENT APPLICATIONS

The present application claims priority to U.S. Provisional Application No. 62/044,699, titled "Cardless ATM Authentication" filed Sep. 2, 2014, the entirety of which is herein incorporated by reference.

BACKGROUND

Automated teller machines (ATMs) are widely used throughout the world to offer financial services in convenient locations. ATMs provide a variety of secure financial services without the assistance of a human teller. For example, available financial services may include depositing, withdrawing, or transferring funds, exchanging currency, selecting and viewing account balances, statements, or credit limits, purchasing items such as stamps or gift cards, managing accounts and profiles, etc. User authentication at an ATM is an important tool in ensuring the security of account holders and non-account holders engaging the financial services provided by the ATM. Authentication at an ATM typically involves a user inserting an ATM card (i.e., a debit card, a payment card, etc.) into the ATM and entering a pre-determined pin number when prompted on the screen.

The utilization and capabilities of electronic mobile devices have increased tremendously over the past decade and continue to evolve. For example, cellular phones, particularly smart phones, allow users the ability to send and receive phone calls, voice messages, text messages, and email messages; perform research using an internet browser; listen to and create music; create, send, and receive pictures; find directions; store important documents; access sensitive financial account data; etc. As such, security features of mobile devices have evolved to reflect the advancing roles mobile devices play in many instances of modern day living. Some security features include a fingerprint scanner for access, several pin numbers for individual services accessible through the mobile device, an electronic locator for the mobile device, sophisticated protection software, alerts for attempted or unrecognized uses, etc.

SUMMARY

One example embodiment of the disclosure relates to a method for cardless authentication of a user at an automated teller machine (ATM). The ATM may be operated by a financial institution such as a bank. The method comprises displaying an initial screen on the ATM and authenticating the user at the ATM using authentication information transferred from a mobile device. The method further comprises determining available service options for the user of the ATM based upon the cardless authentication of the user at the ATM using the mobile device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION OF EXAMPLE EMBODIMENTS

The methods and systems below describe cardless authentication of a user at a transaction machine (e.g., an automated teller machine or "ATM") wherein a user may be authenticated based upon the use of a mobile device, such as a smart phone, as opposed to an ATM card. After a transaction is initiated at an ATM, the ATM may then receive authentication information from the mobile device of a user. The authentication information may include information entered by the user into the mobile device (e.g., a password), an image (e.g., a quick response (QR) code or other machine-readable code) generated by the mobile device, proximity/location information, biometric features, other information provided by security features of the mobile device, etc. Upon authenticating the user, the ATM may provide the user with a different or higher level of capabilities and services than would be provided to a user authenticated using an ATM card. In some embodiments, the user may be provided with access to capabilities and services of the ATM in a manner that is faster and easier for the user.

Figure 1:
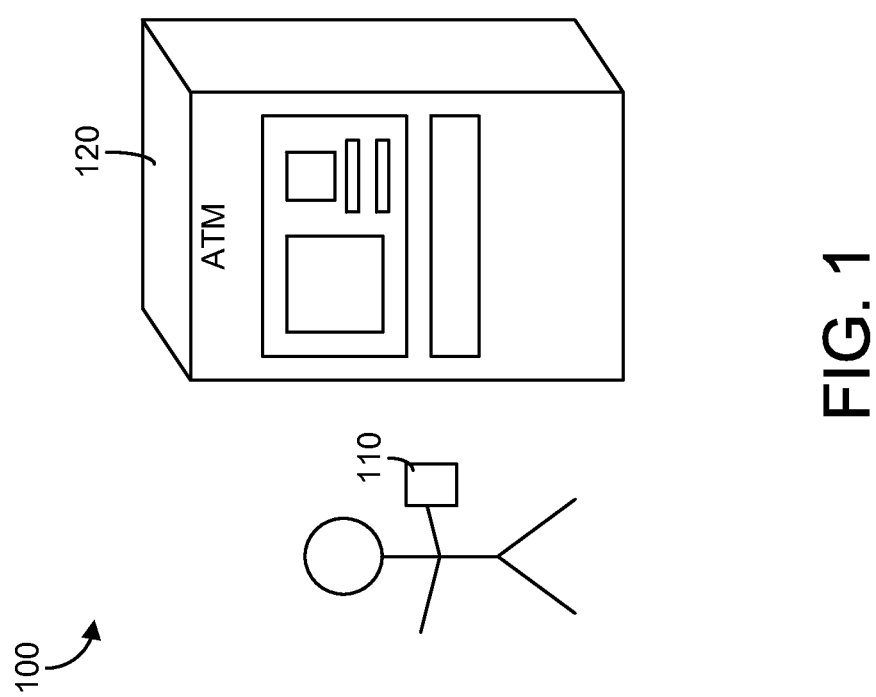
FIG. 1 is a perspective view of a cardless authentication system according to an example embodiment.

Referring to FIG. 1, a perspective view of a cardless authentication system 100 is shown. A user is shown at an ATM 120 preparing to engage in a transaction. The ATM 120 may be owned and/or operated by a financial institution, such as a bank or credit union. The user may hold an account at the financial institution or the user may hold an account at a financial institution different from the financial institution owning the ATM 120. The mobile device 110 may be used in place of a traditional ATM card typically inserted into an ATM 120 in order to carry out ATM transactions.

The ATM 120 may be connected to a secure computer network of the financial institution. The financial institution may have additional computer systems that are connected (e.g., via an interbank network) to other financial institutions. For example, if the user holds a non-native card associated with one or more accounts at another financial institution, the interbank network may connect to the other financial institution. The user may access the ATM 120 to complete a variety of transactions. For example, the user may access the ATM 120 for services such as withdrawing funds, transferring funds, depositing funds, exchanging currency, selecting and viewing account balances, purchasing items such as stamps or gift cards, etc. Upon interacting with the ATM 120, the user may enter or otherwise provide authentication information to the ATM 120, and the information may be transferred to a financial institution computing system. The user is then allowed to perform transactions based on the authentication performed via the mobile device 110.

Figure 2:
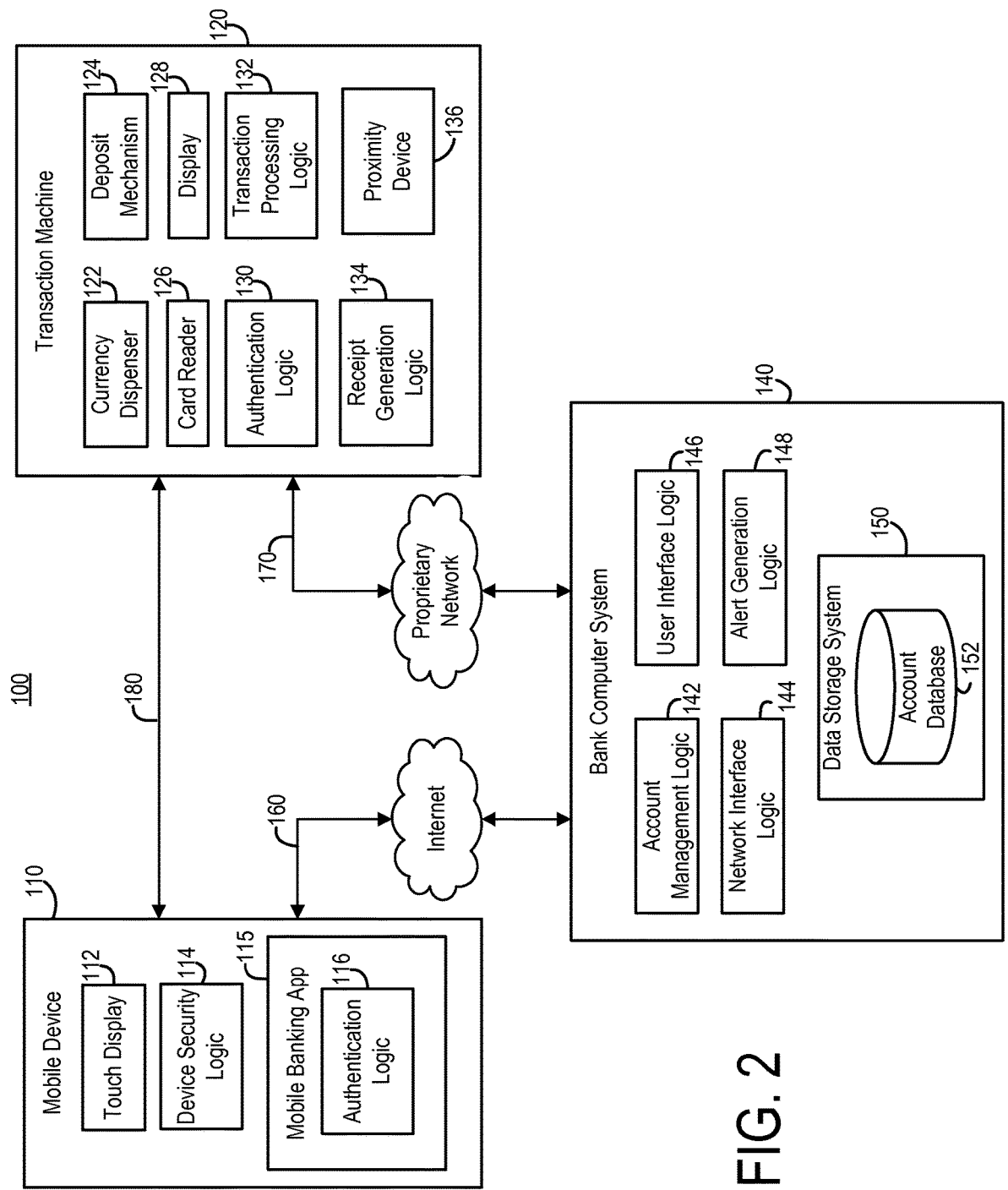
FIG. 2 is a more detailed schematic diagram of a system that includes a transaction machine that communicates with a bank computer system.

Referring now also to FIG. 2, the arrangement of FIG. 1 is shown in greater detail. As shown more clearly in FIG. 2, system 100 includes the mobile device 110, the ATM 120, and a bank computer system 140. The mobile device 110 and the bank computer system 140 may be in communication with each other via a network 160, such as the Internet. The ATM 120 and the bank computer system 140 may be in communication with each other via a network 170, such as a proprietary network. The mobile device 110 and the ATM 120 may be in communication with each other via a wireless connection, such as Bluetooth, NFC, or other wireless connection mechanism.

The mobile device 110 may be a hand held portable electronic device, such as a mobile phone, gaming device, portable media device, tablet, laptop, etc. The mobile device 110 may include logic disposed within memory and executable by a processor to perform various operations described herein. The memory may also store various applications, such as an application 115 of the bank that facilitates communication between the mobile device 110 and the various computing systems 120, 140 of the bank.

The mobile device may include a touch screen 112 configured to receive inputs from the user. In other arrangements, the display 112 and the user input device are separate devices (e.g., the user input device may comprise a separate physical keyboard). The user input/output devices may also include speakers, keyboards, notification LEDs, microphones, biometric sensors (e.g., fingerprint scanners), buttons, switches, cameras, or a combination thereof.

The mobile device may further include device security logic 114 that is configured to control and facilitate the security features of the mobile device 110. The security features may be implemented at various levels including operating systems in the mobile device 110, in software layers, and in downloadable applications. The security features may be pre-installed in the mobile device 110 before receipt by a customer, or the security features may be added to the mobile device 110 by a user (i.e., downloaded) after the user receives the mobile device 110. The security features may also include hardware-implemented security features. For example, such security features may include biometric identification by means of the user's morphology (i.e., body prints and face or eye recognition) or identification by means of identifying a user by the user's behavior (i.e., signature).

The mobile device 110 may also have installed thereon a mobile banking application 115 that includes ATM authentication logic 116. ATM authentication logic 116 may be configured to facilitate authentication with the ATM 120 using the mobile device 110. The authentication logic 116 may transfer information from the mobile device 110 to the ATM 120 and receive information from the ATM 120. For example, the ATM authentication logic 116 may receive and respond to requests from the ATM 120 to transfer a user's authentication information to the ATM 120.

In some arrangements, the mobile banking application 115 stores authentication information in the form of a customer token and/or a device token. The customer token and device token may be tokens that identify the user and the associated user device to the bank computer system 140 in the future. The tokens may be initially created by and encrypted by the bank computer system 140 and then transmitted to the mobile device 110. The tokens may be created as part of installing mobile banking application 115 on the mobile device 110. After the tokens are created and stored on the user device, the tokens may be used to supplement or as a substitute for manually entered authentication provided by the user via the mobile device 110. In an example embodiment, each time the user accesses the bank computer system 140 with a new user device, the new user device is assigned its own device token. A device and customer token are stored on each device in order to bind the device to the user (one user device can only have user associated with it, but one user can have multiple user devices). In alternative embodiments, a user device can be associated with multiple users. Once the mobile device 110 is registered with the user, the user may be required to manually enter less information during an authentication process than if the tokens are not present on the mobile device 110. For example, the user may have an online banking password consisting of a combination of eight or ten or more characters including numbers, upper and lower case characters, punctuation marks, and so on. Rather than enter the full online banking password, the user may only need to enter their existing ATM PIN, device password, or other information to be authenticated via the mobile device 110.

Although not specifically shown, it will be appreciated that the mobile device 110 may also include a wireless network interface comprising a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Additionally, the interface may be capable of communicating with the bank computer system 140 via the network 160 (e.g., the Internet as accessed through a cellular data network). In some arrangements, the mobile device 110 includes a location sensor (e.g., GPS sensor).

The transaction machine 120 may, for example, be an automated teller machine (ATM), a point of sale device, or other device. For purposes of providing an example, FIGS. 1 and 2 shows the transaction machine as being an ATM. The ATM 120 may include a currency dispenser 122, deposit mechanism 124, card reader 126, display 128, authentication logic 130, transaction processing logic 132, receipt generation logic 134, and a proximity device 136. Other hardware may also be included, such as a keypad or buttons for receiving user inputs. The ATM 120 may include logic disposed within memory and executable by a processor to perform various functions as disclosed herein.

The currency dispenser 122 may dispense currency notes ("cash") to an account holder from their financial institution accounts. The currency dispenser 122 may be configured to dispense currency in various denominations, as specified by the account holder. The deposit mechanism 124 may be configured to accept deposits, such as envelope or envelope-free deposits of cash and/or checks.

The card reader 126 may be configured to scan information from a magnetic stripe ("magstripe") of a transaction card. The card reader 126 may be configured to read information from a credit card, debit card, ATM card, stored value card, or the like. While performing the read operation, the card reader 126 may be configured to read the account information and the PIN associated with the card and the account.

The display 128 may be configured to display graphics such as menus, instructions, background photos (e.g., advertisements, etc.), logos, and so on. In one embodiment, the display 128 is a touch screen display that is capable of detecting user touches, e.g., to make menu selections. The display 128 allows the account holder to interact with the transaction machine 120 in order to process transactions. The transactions may include withdrawing funds, purchasing one or more goods or services, transferring funds from one account to another account, paying a bill or mortgage and so on. The display 128 may be used to display various menu options transactions to the account holder. The ATM 120 may include user interface logic configured to generate a graphical user interface for presentation to the user via the display 128.

The authentication logic 130 may be configured to authenticate information received by the ATM 120 to approve or reject a transaction. The authentication logic 130 may approve or deny authentication for transaction data received by ATM 120. The authentication logic 130 authenticates a user as being a valid account holder at the bank.

According to example embodiments, the authentication logic 130 facilitates the authentication of an ATM 120 user by way of the mobile device 110 so that the transaction processing logic 132 may carry out a financial transaction. The authentication logic 130 may request authentication information from the mobile device 110 to verify the identity of a user. In some embodiments, the authentication logic 130 is triggered to request authentication from the mobile device 110 based upon a communication or signal received from the bank computer system 140. For example, when the mobile device 110 is in close proximity to the ATM 120, the mobile device 110 may detect a beacon signal transmitted by the ATM 120 and communicate the beacon identifier to the bank computer system 140. The bank computer system 140 may then identify the ATM 120 based on the beacon identifier and transmit a command to the ATM 120 to initiate a transaction with the mobile device 110, e.g., via a wireless connection (e.g., Bluetooth, NFC, etc.) with the mobile device 110. In other embodiments, the user may initiate a transaction with the ATM 120, and the authentication logic 130 may request authentication information from the mobile device 110 in response to the transaction initiation. For example, the display 128 may allow the user to select authentication by a transaction (ATM) card, authentication by mobile device 110, etc. Upon receiving a selection to authenticate by a mobile device 110, the authentication logic 130 may then proceed with an authentication process involving retrieving information from the mobile device 110.

The transaction processing logic 132 processes each transaction requested by the account holder. For example, the transaction processing logic 132 may cooperate with the account management logic 142 of the bank computer system 140 to ensure that transactions are properly debited/credited to the account held by the account holder. The transaction processing logic 132 may also cooperate with the bank computer system 140 to process transactions such as transferring funds, making purchases and payments, etc. The receipt generation logic 134 generates a receipt for each transaction.

According to some embodiments, the ATM 120 may contain a proximity device 136 configured to broadcast information to the mobile device 110. In some embodiments, the proximity device 136 may be implemented using a beacon that transmits a beacon identifier that is detectable by the mobile device 110. For example, the beacon may include a processor and a memory that includes program modules that, when executed by the processor, control the operation of the beacon to transmit the unique beacon identifier. The unique beacon identifier of the beacon may be programmed into the memory and broadcast by a radio frequency transmitter (e.g., a Bluetooth® transmitter). Upon receipt by the mobile device 110, the mobile device 110 may then retransmit the beacon identifier to the bank computer system 140, such that the bank computer system 140 is alerted that the user is within close proximity of the ATM 120.

The bank computer system 140 may be provided or controlled by a bank or other financial institution and the users may be the customers or account holders of the financial institution. The users may access the bank computer system 140 through tellers at retail bank branches, through the Internet, or through the transaction machine 120. In FIG. 1, for example, an account holder is shown accessing the bank computer system 140 through the transaction machine 120. In practice, the bank computer system 140 may include server computing systems, for example, comprising one or more networked computer servers having a processor and non-transitory machine readable media. The logic or logics described herein may therefore be implemented as program logic that is stored on the machine-readable media and that, when executed by the processor, causes the processor to perform the operations described herein.

The bank computer system 140 may further include, among other systems, account management logic 142, network interface logic 144, user interface logic 146, alert generation logic 148, and data storage system 150. Account management logic 142 may perform various tasks in connection with accounts held by account holders at the financial institution, such as account processing (processing of account debits and credits), authentication, statement generation, account status, funds transfers, and so on. Account management logic 142 may also maintain a log of all transactions that occurred in the past and store data related to the account in a data storage system 150.

Network interface logic 144 may be used to connect the bank computer system 140 to communicate with other systems such as the mobile device 110 and the transaction machine 120. An embodiment of the network interface logic 140 may be configured to communicate with the transaction machine 120 over network 170, which may be a proprietary encrypted network. In other embodiments, network 170 may be a public encrypted network. The network interface logic 144 may also connect to the Internet to permit account holders access the bank computer system 140 through an on-line banking area of a website of the bank. Network interface logic 144 may also comprise other logic that is configured to provide an interface for other types of devices such as mobile devices (including cell phones, smart phones, mobile slate or pads), fax machines, and server-based computing systems.

User interface logic 146 may generate menus and menu options presented to the user via various computing devices (e.g., e.g., mobile device 110, ATM 120, and so on). The computer system 140 may cooperate with the mobile device 110 and the transaction machine 120 to provide such user interfaces. In FIG. 2, the user interface logic 146 is shown as comprising program logic located at the bank computer system 140. In practice, such logic may located at the bank computer system 140, at the transaction machine 120, at the mobile device 110 (e.g., via mobile banking app 115), or at a combination thereof. That is, the operations described herein as being performed by the user interface logic 146 may be performed either at the bank computer system 140, at the transaction machine 120, at the mobile device 10, or at a combination thereof. The user interface logic 146 generates a graphical user interface for presentation to the account holder at the transaction machine 120 via display 128 or at the mobile device 110 via display 112.

Alert generation logic 148 may generate alerts for account holders. For example, the alert generation logic 148 may track information regarding the due dates of various bills and generate alerts regarding an account holders past due bills or bills due in the near future. The alert generation logic 148 may also generate alerts regarding other account activity, e.g., alerts about possible fraudulent transactions.

The data storage system 150 may include an account database 152. The account database 150 can be structured according to various database types, such as, relational, hierarchical, network, flat or object relational. The account database 150 may be configured to store account balances and a log of each transaction processed by the account management logic 142.

Figure 3:
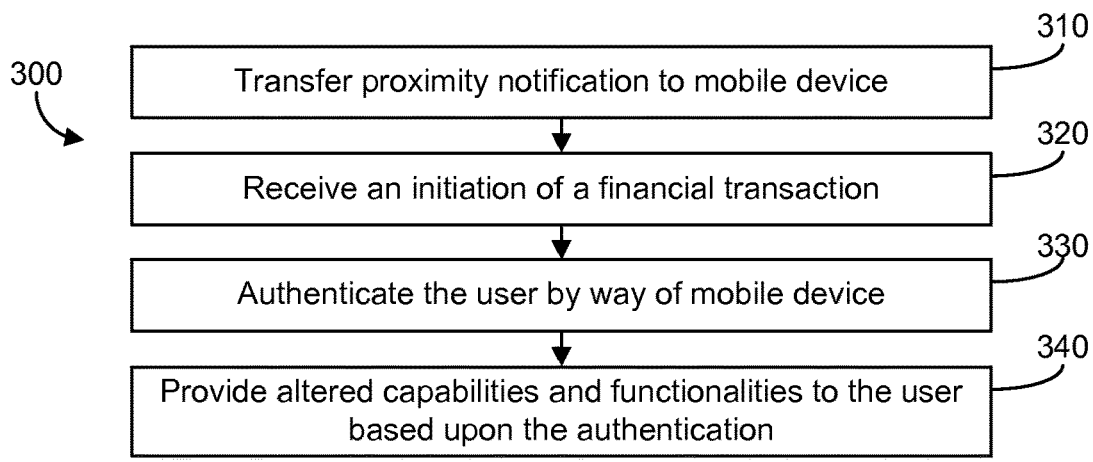
FIG. 3 is a flow diagram of a process implemented by an ATM for cardless ATM authentication according to an example embodiment.
Figure 4:
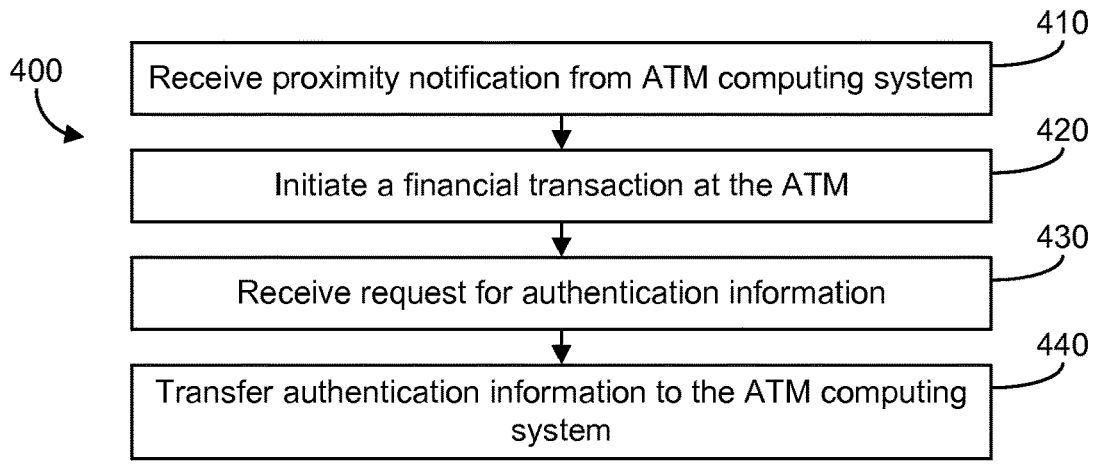
FIG. 4 is a flow diagram of a process implemented by a mobile device for cardless authentication according to an example embodiment.
Figure 5:
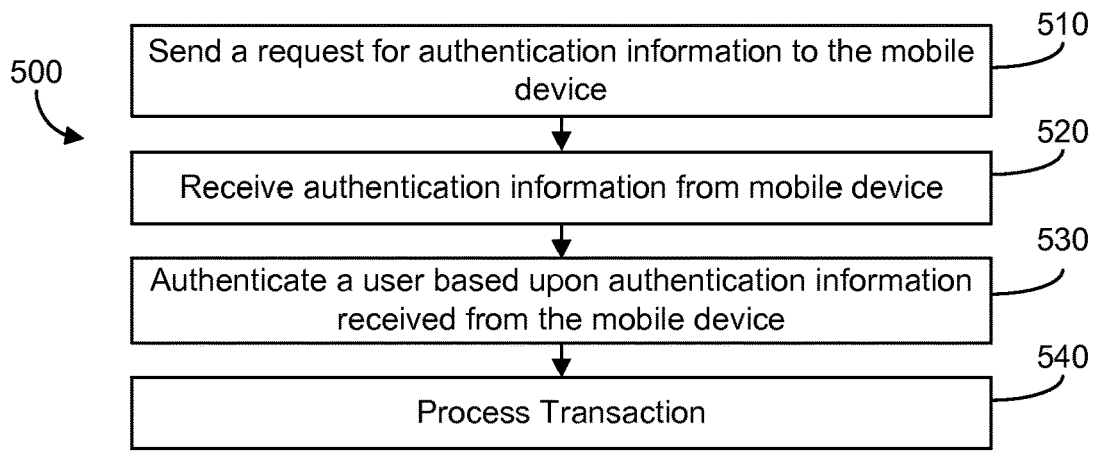
FIG. 5 is a flow diagram of a process implemented by a bank computer system for cardless authentication according to an example embodiment.

Referring now to FIGS. 3-5, flow diagrams of a cardless ATM authentication process are shown according to an example embodiment. FIG. 3 shows steps performed by ATM 120, FIG. 4 shows steps performed by mobile device 110, and FIG. 5 shows steps performed by bank computer system 140.

Authentication may be initiated when the ATM 120 transmits a proximity notification to the mobile device 110 (FIG. 3, step 310). The proximity notification may be transmitted as a beacon signal and may include a beacon identifier. The proximity notification is received by the mobile device 110 (FIG. 4, 410). As discussed above, the proximity notification may provide an indication to the mobile device that the mobile device 110 has entered an area proximate the ATM 120 where cardless authentication using the mobile device 110 may be performed. Upon detecting the beacon signal, the mobile device 110 may prompt the user whether the user wishes to perform a transaction at the ATM 120. Upon receiving an affirmative response from the user, the mobile device 110 may also transmit a signal to the ATM 120 to initiate a transaction (FIG. 3, step 320). Additionally or alternatively, the mobile device 110 may also retransmit the beacon identifier to the bank computer system 140 (FIG. 4, step 420). In turn, the bank computer system 140 sends a request for authentication information to the mobile device 110 (FIG. 5, step 510). Authentication information may also be requested by the ATM 120.

In some embodiments, rather than using a beacon identifier, a user may initiate a financial transaction with the ATM 120 by engaging a keypad or a display on the ATM 120. For example, a home screen may be displayed on the display of the ATM 120 and may have an area for starting a transaction. In some embodiments, the home screen may display a number of financial services available at the ATM 120, wherein the user may select a service in order to begin a transaction. The ATM 120 may then establish a wireless connection (e.g., Bluetooth connection) with the mobile device 110 and request authentication information via the mobile device 110 via the wireless connection.

The request for authentication information is received by the mobile device 110 (FIG. 4, step 430). In response, the mobile device 110 provides the requested information (FIG. 4, step 440). The authentication that is provided may vary according to various embodiments. For example, in some embodiments, the mobile device 110 may provide the customer token and the device token stored by the mobile banking application 115, as discussed above. The device token and customer token uniquely identify the mobile device 120 as being associated with the user. Possession of the mobile device 110 thereby provides a level of authentication. As will be appreciated, the mobile device 110 may also be password protected. Hence, the ability of the user to access the mobile banking application 115 (after having necessarily also entered the mobile device password) also provides a level of authentication. In some embodiments, the user may be prompted to provide online banking credentials via the mobile device 110. In some embodiments, the user may be prompted to provide an ATM PIN via the mobile device 110. In some embodiments, no further authentication information may be requested.

Other types of authentication information may also be used. For example, the authentication information may comprise biometric information, such as a finger print, thumb print, hand print, or any print of the body. Authentication information may also comprise a facial image, an eye image, a vocal sample, etc. Additionally information such as a code, a gesture pattern on the mobile device 110 (i.e., hand pattern, phone movement pattern, keypad entry pattern, etc.), a security image recognizable by the user, a vibrational pattern on phone, etc., may be sent as authentication information. The authentication information may be captured by the mobile device 110 or by another device and simply added to the mobile device 110. For example, the information may be captured using a camera or microphone within the mobile device 110, a touch screen on the mobile device 110, etc. Any one or a combination of the authentication information described throughout may be used to authenticate the user. The ability to use such varying types of authentication may provide for a higher level of security than a four digit PIN associated with an ATM card.

The bank computer system 140 may receive the requested authentication information from the mobile device (FIG. 5, step 520). The information may be received either directly (via network 160) or indirectly through the ATM 120 (via network 170). The bank computer system 140 may compare the authentication information against stored information to assess whether a match exists and, based on whether a match exists, determine whether to authenticate the user (FIG. 5, step 530).

Once the user is authenticated at the bank computer system 140, the bank computer system 140 transmits a message to the ATM 120 confirming the authentication. This message is received by the ATM 120 (FIG. 3, step 330), whereupon the user may be provided with the ability to perform transactions at the ATM (FIG. 3, step 340). The transactions that are performed at the ATM 120 are processed by the bank computer system 140 (FIG. 5, step 540).

According to example embodiments, an ATM 120 that authenticates a user by way of a mobile device 110 as opposed to an ATM card will provide the user with different capabilities. Such an arrangement may be used to provide the user with easy yet secure account access, and may in some instances may be used to provide the user with a higher level of capabilities and services than may be available through use of an ATM card for authentication.

For example, in one embodiment, the bank computer system 140 may specify a daily maximum withdrawal amount. The maximum withdrawal amount is typically less than the amount that could be withdrawn via a human bank teller at a store location of the bank. In such a situation, the user may be provided with an increased daily withdrawal limit with authentication by mobile device 110. For example, if the user is typically able to withdraw a maximum of $300 per day from an ATM 120 when authenticated by an ATM card, the user may be authorized to withdraw a maximum of $500 or $1000 per day when being authenticated using the user's mobile device 110. In some embodiments, the withdrawal limit may be dynamically determined at the ATM 120 based on the level of security determined to be in place for the mobile device 110. For example, if it is determined that the mobile device is password-protected with password having a first length (e.g., six digit numeric PIN), the user may be provided with a first maximum withdrawal limit (e.g., $500). The first maximum withdrawal limit may be larger than the ATM card maximum withdrawal limit, on the assumption that a six digit PIN is more secure than the four digit numeric pin typically used for ATM cards. If, further, it is determined that the mobile device is password-protected with password having a second length (e.g., eight characters, including either all letters or a combination of letters, numbers, and punctuation marks), the user may be provided with a second maximum withdrawal limit that is larger than the first maximum withdrawal limit (e.g., $1,000).

As another example, authentication by mobile device 110 may enable the user to have an increased amount of services available at the ATM 120. For example, in some situations, a bank may offer certain services through some channels but not others. For example, a user that already has one or more accounts with the bank (e.g., demand deposit, credit card, and mortgage) may wish to open another type of account with the bank (e.g., an unsecured line of credit). The bank may allow the line of credit to be opened in-store but not via an ATM. In such a situation, the enhanced security offered by authentication via the mobile device 120 may permit the line of credit to be opened via the ATM 120. Other account maintenance functions may also be offered to users that authenticate via a mobile device in lieu of an ATM card.

As another example, the user may be provided with the ability to pre-stage a transaction using a mobile banking application or via an online banking area of the bank's website. For example, the user may go to an online banking area of a website of the bank to configure a transaction (e.g., "withdraw $1,000 at the ATM on the corner of 5th and Main Street sometime within the next 30 minutes"). Again, the amount to be withdrawn may be in excess of the otherwise maximum daily withdrawal limit for the ATM for card-based transactions. When the user arrives at the ATM 120 on the corner of 5th and Main Street, the mobile device 110 of the user may detect a beacon signal broadcast by the ATM 120. The mobile banking application 115 may then transmit the beacon identifier to the bank computer system 140 along with the customer token and device token stored by the mobile banking application 115 on the mobile device 110. Hence, the bank computer system 140 may recognize that the user is currently at the ATM on the corner of 5th and main. Further, the user may be considered to have been authenticated by virtue of possession of the mobile device 110 and the transmission of the device token and the customer token to the bank computer system 140. Additional security may be attained by virtue of the fact that a fraudster would not know to show up at the ATM on the corner of 5th and Main Street at the specified time in order to receive money from the ATM. Based on this information, the $1,000 currency may be dispensed to the user at the ATM machine. In some embodiments, the user may be prompted to provide further authentication information at the ATM 120. In other embodiments, the currency may be dispensed without the user having to manually provide any further authentication information ATM. That is, the user may simply show up with their mobile device 110 at the specified ATM at the specified time, and the currency is dispensed to the user without any manual entry of authentication information at the ATM 120 or via the mobile device 110. For example, the user may not be required to enter a device password for the mobile device 110 in order for the currency to be dispensed, even though the device may otherwise be password-protected. In some embodiments, the mobile device 110 may prompt the user to confirm that the user is ready to receive the currency before the currency is dispensed (e.g., to ensure that there is not another user standing in front of them in line). For example, a prompt may be provided to the user via the mobile device 110 (e.g., "Press the 'Dispense Now' button below when you are at the ATM and ready to receive your money."). In some embodiments, the beacon broadcast energy is set sufficiently low that the beacon can only be detected by the mobile device 110 if the user is standing immediately in front of the ATM machine. As another example, a code may be transmitted to the mobile device 110 (e.g., via text messaging), and the currency may be dispensed upon entry of the code into the ATM 120.

As another example, features described herein may be provided to non-customers as well (i.e., users that do not hold an account with the bank that operates the ATM 120). For example, a user may have an account at Bank A, but may frequently use an ATM that is operated by Bank B (e.g., because the ATM is near where the customer works). In such an arrangement, the user may be provided with the ability to install the mobile banking application 115 of Bank B on their mobile device 110, even though the user is not a customer of Bank B, in order to gain access to the enhanced authentication features described herein when the customer uses the ATM of Bank B.

As another example, a user that is a non-customer of the bank that operates the ATM 120 may be offered a more limited set of services at the ATM. However, if the non-customer user is authenticated using a mobile device 110, the non-customer user may be provided with a greater range of service options. Authentication by mobile device 110 may also allow increased abilities with services such as withdrawal, deposits, payments, fund transfers, donations, etc.

In some embodiments, the level of authentication that is employed is determined based on the transaction that the user wishes to perform. For example, the user may arrive at the ATM 120. The mobile device 110 of the user may detect a beacon signal broadcast by the ATM, and transmit the beacon identifier, the device token, and the customer token to the bank computer system 140. The ATM 120 may then provide the user with a menu of transaction options for transactions to be performed. The user is thus identified at the ATM and preliminarily authenticated. If the user selects a low dollar value transaction (e.g., purchase a book of stamps, withdraw $20, etc.), the transaction may be completed without requesting further authentication information from the user. However, if a large dollar value transaction is selected (e.g., withdraw $1,000), the user may be asked for additional authentication information. The level of authentication information that is requested may be commensurate with the risk (including dollar value) associated with the transaction. Again, the user may be authenticated to perform transactions that exceed the transaction limits in place for transactions conducted via authentication with an ATM card.

In some embodiments, the user may also be permitted to configure settings for transactions conducted via device-based authentication using an online banking website of the bank computer system 140. For example, a user may be provided with the ability to specify ATM locations that may be used, transaction limits, and so on.

As noted above, embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc. configured to perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the disclosure's operating conditions and arrangement of the embodiments without departing from the scope of the present disclosure.

What is claimed is:

1. A method for cardless authentication of a user at an automated teller machine (ATM) comprising:
   generating and encrypting, by a bank computer system, a customer token and a device token as part of a mobile banking application being installed on a mobile device of the user, the customer token identifying the user, the device token identifying the mobile device;
   providing, by the bank computer system, the encrypted customer token and the encrypted device token to the mobile device of the user;
   storing, by the mobile device, the encrypted customer token and the encrypted device token within the mobile banking application;
   pre-staging a withdrawal transaction to be performed at the ATM, wherein pre-staging the withdrawal transaction comprises:
      receiving, by the bank computer system, a first indication that the withdrawal transaction is to be performed at the ATM, from the mobile device of the user;
      receiving, by the bank computer system, a second indication of a time period in which the withdrawal transaction will take place at the ATM, from the mobile device; and
      receiving, by the bank computer system, a third indication of an amount of currency to be withdrawn during the withdrawal transaction at the ATM, from the mobile device;

broadcasting, by a proximity device of the ATM, a proximity notification to the mobile device as a wireless signal including an ATM identifier, wherein the ATM identifier is programmed into a memory of the proximity device and is broadcast by a radio frequency transmitter;
receiving, by the mobile device, the proximity notification broadcast by the ATM, the proximity notification providing an indication that the mobile device has entered an area proximate the ATM where the cardless authentication is performable;
transmitting, by the mobile banking application via the mobile device and in response to the mobile device receiving the proximity notification from the ATM, the ATM identifier, the encrypted customer token, and the encrypted device token, to the bank computer system;
transmitting, by the mobile device, a device password entered by the user on the mobile device, to the bank computer system;
receiving, by the bank computer system, the ATM identifier, the encrypted customer token, the encrypted device token, and the device password, from the mobile device;
determining, by the bank computer system, that the mobile device is password-protected with the device password having one of a first length or a second length, the second length being longer than the first length;
authenticating, by the bank computer system, the user at the ATM using the ATM identifier, the encrypted customer token, the encrypted device token, the device password and the time period transmitted from the mobile device;
identifying, by the bank computer system, the ATM based on the ATM identifier received from the mobile device;
providing, by the bank computer system, either a first device-based maximum withdrawal limit or a second device-based maximum withdrawal limit, wherein the first device-based maximum withdrawal limit is provided based on determining that the device password is the first length, the second device-based maximum withdrawal limit is provided based on determining that the device password is the second length, and the second device-based maximum withdrawal limit is larger than the first device-based maximum withdrawal limit;
transmitting, by the bank computer system, a command to the ATM to initiate the withdrawal transaction; and
dispensing, by the ATM, the amount of currency to be withdrawn to the user, wherein the amount of currency to be withdrawn is in excess of a maximum withdrawal limit in place at the ATM for card-based transactions.

2. The method of claim 1, further comprising dispensing currency from the ATM to the user without any manual entry of authentication information by the user into the ATM.

3. The method of claim 1, further comprising determining a level of authentication information to be obtained based on risk associated with a transaction selected by the user at the ATM.

4. The method of claim 1, further comprising presenting an option for the user to select mobile device authentication instead of a card-based authentication on an initial screen of the ATM.

5. A system for cardless automated teller machine (ATM) authentication comprising:
a mobile device of a user configured to:
receive an encrypted customer token and an encrypted device token from a bank computer system, the customer token identifying the user, the device token identifying the mobile device;
store the encrypted customer token and the encrypted device token within a mobile banking application installed on the mobile device;
pre-stage a withdrawal transaction to be performed at an ATM, wherein pre-staging the withdrawal transaction comprises:
receiving a first indication that the withdrawal transaction is to be performed at the ATM;
receiving a second indication of a time period in which the withdrawal transaction will take place at the ATM;
receiving a third indication of an amount of currency to be withdrawn during the withdrawal transaction at the ATM; and
transmitting the first indication, the second indication, and the third indication to the bank computer system;
receive a proximity notification broadcast by the ATM, the proximity notification providing an indication that the mobile device has entered an area proximate the ATM where the cardless ATM authentication is performable;
in response to receiving the proximity notification from the ATM, transmit, by the mobile banking application via the mobile device, an ATM identifier, the encrypted customer token, and the encrypted device token to the bank computer system; and
transmit a device password entered by the user on the mobile device to the bank computer system;
the bank computer system configured to:
generate and encrypt the customer token and the device token as part of the mobile banking application being installed on the mobile device of the user;
provide the encrypted customer token and the encrypted device token to the mobile device of the user;
receive the ATM identifier, the encrypted customer token, the encrypted device token, and the device password from the mobile device;
determine that the mobile device is password-protected with the device password having one of a first length or a second length, the second length being longer than the first length;
authenticate the user at the ATM using the ATM identifier, the encrypted customer token, the encrypted device token, the device password and the time period transmitted from the mobile device;
identify the ATM based on the ATM identifier received from the mobile device;
provide either a first device-based maximum withdrawal limit or a second device-based maximum withdrawal limit, wherein the first device-based maximum withdrawal limit is provided based on determining that the device password is the first length, the second device-based maximum withdrawal limit is provided based on determining that the device password is the second length, and the second device-based maximum withdrawal limit is larger than the first device-based maximum withdrawal limit; and
transmit a command to the ATM to initiate the withdrawal transaction; and the ATM associated with a financial institution and coupled to the bank computer system, the ATM configured to:
  broadcast, by a proximity device of the ATM, the proximity notification to the mobile device as a wireless signal including the ATM identifier, wherein the ATM identifier is programmed into a memory of the proximity device and is broadcast by a radio frequency transmitter; and
  dispense the amount of currency to be withdrawn to the user, wherein the amount of currency to be withdrawn is in excess of a maximum withdrawal limit in place at the ATM for card-based transactions.

6. The system of claim 5, wherein the ATM is further configured to dispense currency to the user without any manual entry of authentication information by the user into the ATM.

7. The system of claim 5, wherein the user is further authenticated using additional authentication information based on a determined risk associated with a transaction selected by the user at the ATM.

8. The system of claim 5, wherein the ATM is further configured to detect a presence of the mobile device within a predetermined proximity of the ATM.

9. The system of claim 5, wherein the ATM is further configured to present an option for the user to select mobile device authentication instead of a card-based authentication on an initial screen of the ATM.

10. The method of claim 1, wherein the first indication that the withdrawal transaction is to be performed at the ATM from the mobile device of the user is received after security control logic of the mobile device authenticates the user of the mobile device.

11. The method of claim 10, wherein the security control logic authenticates the user based on identifying the user based on a biometric of the user.

12. The method of claim 11, wherein identifying the user based on the biometric of the user is based on facial recognition or a finger or thumb print of the user.

13. The method of claim 12, wherein the mobile device captures the biometric of the user by activating a camera of the mobile device.

* * * * *